United States Patent

Fahnoe

[15] 3,638,101

[45] Jan. 25, 1972

[54] CURRENT OR VOLTAGE-TO-FREQUENCY CONVERTER USING NEGATIVE FEEDBACK

[72] Inventor: Eric R. Fahnoe, Wilmington, Del.

[73] Assignee: Hercules Incorporated, Wilmington, Del.

[22] Filed: June 24, 1970

[21] Appl. No.: 49,305

[52] U.S. Cl. ....................................321/60, 321/61, 321/69

[51] Int. Cl. ........................................................H02m 5/00

[58] Field of Search ................................307/227–229, 265, 307/271; 321/4, 6, 60, 61, 69; 332/9

[56] References Cited

UNITED STATES PATENTS

| | | | |
|---|---|---|---|
| 3,401,344 | 9/1968 | Andrus et al. | 307/229 X |
| 3,539,825 | 11/1970 | Hardaway | 307/271 X |
| 3,309,603 | 3/1967 | Seliger et al. | 321/60 |
| 3,389,271 | 6/1968 | Gray | 307/271 X |
| 3,419,784 | 12/1968 | Winn | 307/271 X |
| 3,449,695 | 6/1969 | Marsh | 307/271 X |
| 3,505,614 | 4/1970 | Marthe | 321/69 X |
| 3,517,339 | 6/1970 | Hubbard et al. | 307/271 X |
| 2,994,825 | 8/1961 | Anderson | 332/9 X |
| 3,441,877 | 4/1969 | Thompson | 332/9 |
| 3,504,267 | 3/1970 | James et al. | 307/271 X |

*Primary Examiner*—William M. Shoop, Jr.
*Attorney*—Stanley A. Becker and Finnegan, Henderson & Farabow

[57] ABSTRACT

A current or voltage-to-frequency converter is provided for converting a DC current or voltage to a proportionate frequency of electrical pulses of predetermined width. The converter includes an integrator coupled to control the frequency of a voltage-controlled oscillator, and negative feedback is provided to the input of the integrator during the occurrence of pulses from the oscillator to provide high linearity and stability.

11 Claims, 4 Drawing Figures

INVENTOR
ERIC R. FAHNOE

BY Finnegan, Henderson & Farabow
ATTORNEYS

INVENTOR
ERIC H. FAHNOE

BY Finnegan, Henderson & Farabow
ATTORNEYS

CURRENT OR VOLTAGE-TO-FREQUENCY CONVERTER USING NEGATIVE FEEDBACK

This invention relates to a current or voltage-to-frequency converter and more particularly to such a converter having overall negative feedback whereby extremely high linearity and stability is provided by the use of only a few components.

Many types of current or voltage-to-frequency converters are known in the art; however, many of these do not have the desirable characteristic of having high linearity and stability in operation while those characterized by linearity and stability generally have required a large number of components and complex circuitry in order to achieve these objects.

Accordingly, it is an object of the present invention to provide a current or voltage-to-frequency converter having overall negative feedback to achieve high linearity and stability in operation while utilizing only a few components.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these objects the invention provides a unique arrangement whereby an input voltage is connected to an integrated current. The output of the integrator controls a voltage-controlled oscillator which produces output pulses of predetermined width and at a frequency proportionate to the input current or voltage. Overall negative feedback is provided to the input of the integrator during the occurrence of the output pulses so that extremely high linearity and stability in operation of the converter are achieved.

As here embodied and electrical the invention provides a circuit for converting DC electrical energy to a proportionate frequency of electrical pulses of predetermined width and includes means for integrating the electrical energy; oscillator means in circuit with the integrating means for providing the electrical pulses at a frequency controlled by the integrated output from the integrating means; and negative feedback means in circuit with the oscillator means and the integrating means for providing current to the integrating means in opposition to the DC electrical energy.

Preferably, the negative feedback means include an electrical current source having switching means in its circuit, and integrating means and oscillator means for selectively enabling current from the current source to flow into the integrating means in polarity opposition to the DC electrical energy. It is also preferred that the switching means be a transistor having its base terminal coupled to the oscillating means and its collector terminal coupled to the integrating means.

The integrating means is preferably an operational amplifier and includes an amplifier having first and second input terminals and an output terminal; an integrating capacitor coupled between the first input terminal and the output terminal and wherein the output terminal is coupled to the oscillating means and the first input terminal is coupled to the negative feedback means to receive the DC electrical energy.

It is to be understood that both the foregoing general description and the following detailed description are exemplary and explanatory but are not restrictive of the invention.

The accompanying drawings, which are incorporated in and constitute a part of this specification, illustrate examples of preferred embodiments of the invention, and together with the description, serve to explain the principles of the invention.

IN THE DRAWINGS

Figure 1:
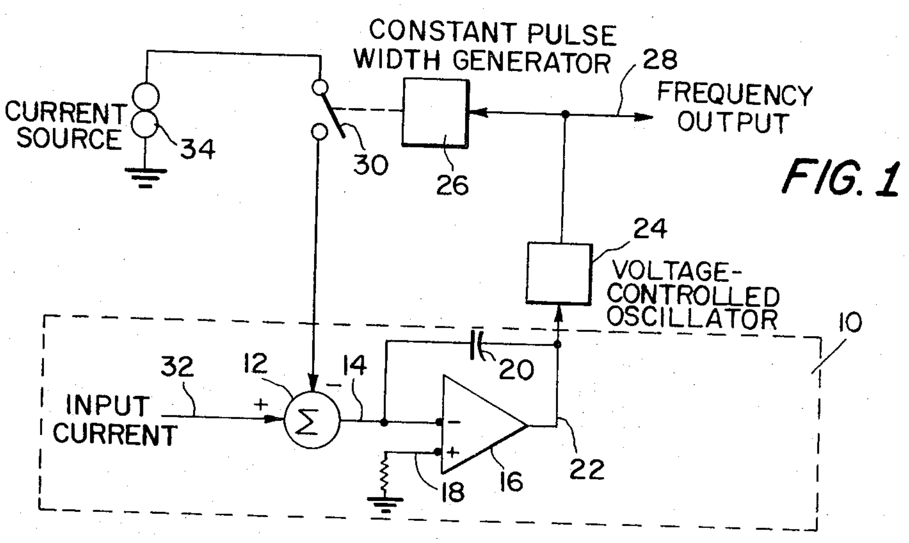
FIG. 1 is a block diagram view of the circuitry of one embodiment of the invention.

With reference now to the drawings, wherein like reference characters designate like or corresponding parts throughout the several views, there is shown in FIG. 1 a circuit in accordance with one embodiment of the invention for converting DC electrical energy to a proportionate frequency of electrical pulses of predetermined width.

Means for integrating the electrical energy are provided. As here embodied, the integrating means 10 include a summing terminal 12 connected to a first input 14 of an amplifier 16 that is connected with a differential input and includes second input 18 referenced to common or ground. The amplifier is a differential input operational amplifier connected as an inverted integrator, and integrating capacitor 20 is coupled between the first input 14 and output terminal 22 of the amplifier. Noninverting integrator could also be used with slight modification in the circuitry as will be apparent to those skilled in the art.

Oscillator means are coupled in circuit with integrating means 10 for providing electrical pulses of predetermined width at a frequency controlled by the integrated output from the integrating means. As here embodied, the oscillator means is voltage-controlled oscillator 24. Oscillator 24 may be designed to itself produce a pulse of constant width; however, in the embodiment of FIG. 1 a constant pulse width generator 26 is coupled to the output of oscillator 24 to produce the desired pulses of constant width. The constant width pulses are provided at output 28 and generator 26 also acts to control current switch 30.

Negative feedback means are provided in circuit with oscillator 24 and with generator 26 for providing current to integrating means 10 in polarity opposition to the electrical energy fed into the converter via input line 32. As here embodied, the negative feedback means is constant current source 34 coupled in circuit with switching means or current switch transistor 30.

In operation of the basic embodiment shown in FIG. 1, input current or voltage is applied via input terminal 32 to integrating means 10. The output of the integrating means controls the frequency of voltage-controlled oscillator 24, and this oscillator, in turn, triggers constant pulse width generator 26 to produce a series of pulses of fixed width and at a frequency related to the input current or voltage. In the alternative, oscillator 24 can be designed to itself produce fixed width pulses so that generator 26 can be eliminated.

Current switch 30 is controlled by the fixed pulse width and this switch closes during the occurrences of the pulses to apply a known current from source 34 to the input summing terminal 12 in opposition to the input current at terminal 32. The circuit is arranged so that increasing input voltage or current increases the frequency of oscillator 24 or of generator 26. Integrator 10 increases or decreases the frequency of oscillator 24 and of generator 26, as necessary, to insure that the average feedback current resulting from the frequency controlled, fixed current, constant width pulses is exactly equal and opposite to the input current on terminal 32.

The linearity and stability of the converter is determined by the accuracy of the feedback pulse width and current. When a voltage is applied to input terminal 32 the accuracy of the input resistor used to convert that voltage to an input current and the input offset of inverting operational amplifier 16 also determine the linearity and stability of the converter. Furthermore, in order to obtain the desired results, the feedback pulses of the converter must be of shorter duration than the minimum output period and the time constant of the integrator 10 must be greater than the maximum output period of the converter.

Several embodiments of the invention are provided and in each embodiment input feedback current summing and error integration is accomplished with a differential input operational amplifier connected as an inverting integrator with a second input to the amplifier referenced to common or ground. Where voltage is to be converted to a proportionate frequency, the voltage is initially converted to an input current by a resistor. The feedback current pulses are provided by a resistor connected to a reference voltage of opposite polarity to that of the input signal.

Negative feedback current is controlled by a bipolar transistor switch or by a field-effect transistor switch in each embodiment. These transistors act as switching means in circuit with a current source for selectively enabling current from the current source to flow into the integrator in polarity opposition to the input voltage or current.

Figure 2:
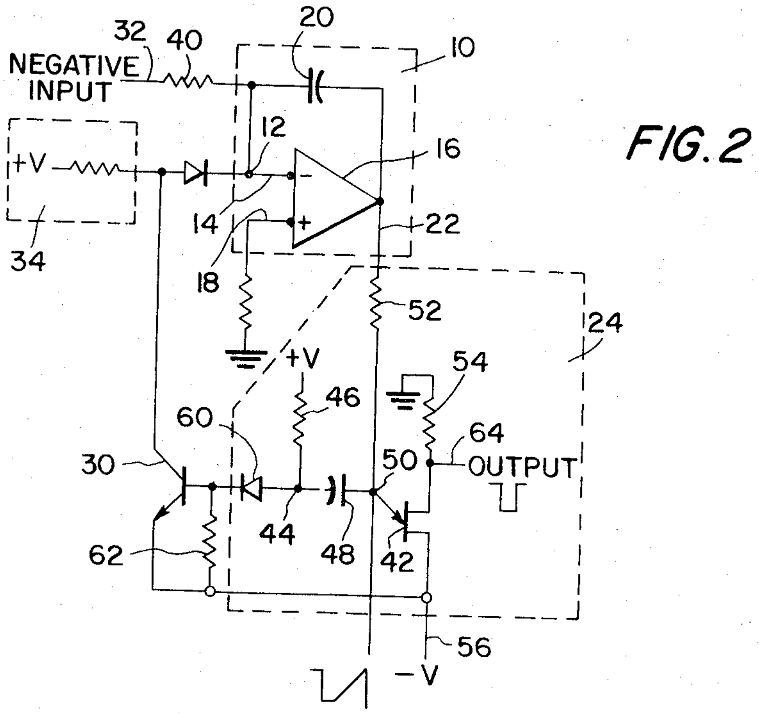
FIG. 2 is a schematic illustration of the circuitry of another embodiment of the invention.

With specific reference now to FIG. 2, one embodiment of the invention is illustrated using a unijunction relaxation oscillator. This converter is operative to convert a negative voltage or current to a proportionate frequency.

Where the negative DC input is a voltage, means are provided in circuit with the integrating means 10 for converting the voltage to a corresponding DC current and this converting means is resistor 40. In addition, although this and each of the other embodiments described uses an inverting integrator, a noninverting integrator may be used with only slight modifications to the circuitry as will be appreciated by those skilled in the art.

Operation of the converter as shown in FIG. 2 is best described in two phases. The first phase is when unijunction transistor 42 is on or in the conducting state to produce an output pulse. The second phase is when the unijunction transistor is off.

Initially, node 44 between resistor 46 and capacitor 48 within oscillator 24 is held at its upper voltage limit by the emitter-base of transistor 30, and the transistor is saturated so that current is diverted from current source 34 through transistor 30. As a negative input is applied at input terminal 32 the voltage at node 50 between capacitor 48 and resistor 52 in oscillator 24 increases in a ramp waveform from a valley voltage point to the peak voltage point of transistor 42 and at a rate determined by resistor 52, capacitor 48, and the voltage on output terminal 22 of integrator 10. The valley voltage point and the peak voltage point are determined by the characteristics of unijunction transistor 42, resistor 54 and the supply voltage at terminal 56 of the unijunction transistor.

As the ramp waveform at node 50 reaches the peak voltage point of transistor 42, the unijunction transistor is turned on causing the voltage at node 50 to drop to the valley voltage point. The value of resistor 46 is chosen to maintain unijunction transistor 42 in the conducting state while capacitor 48 discharges. During the time that unijunction transistor 42 is on and capacitor 48 is discharging, transistor 30 is off or in a nonconducting state so that current from source 34 is no longer diverted through transistor 30 and away from integrator 10. Diode 60 and resistor 62 may be eliminated from the circuit if the emitter-base breakdown voltage of transistor 30 is not exceeded.

Thus, when unijunction transistor 42 is on an output pulse is provided at output terminal 64. Simultaneously, because transistor 30 is off, current from source 34 is no longer diverted through transistor 30 and instead is directed to node 12 and to input 14 of amplifier 16 in polarity opposition to the input current from resistor 40.

As capacitor 48 is discharged via resistor 46, the potential at node 44 increases until transistor 30 is again forward biased and current from resistor 46 is then diverted to transistor 30 so that the transistor is placed into the conducting state. Simultaneously, unijunction transistor 42 switches back to the off state and the current from current source 34, which acts as the feedback current, is diverted from the integrator and through transistor 30. Negative feedback, therefore, is absent when a pulse is not being produced at output terminal 64 by unijunction transistor 42.

Figure 3:
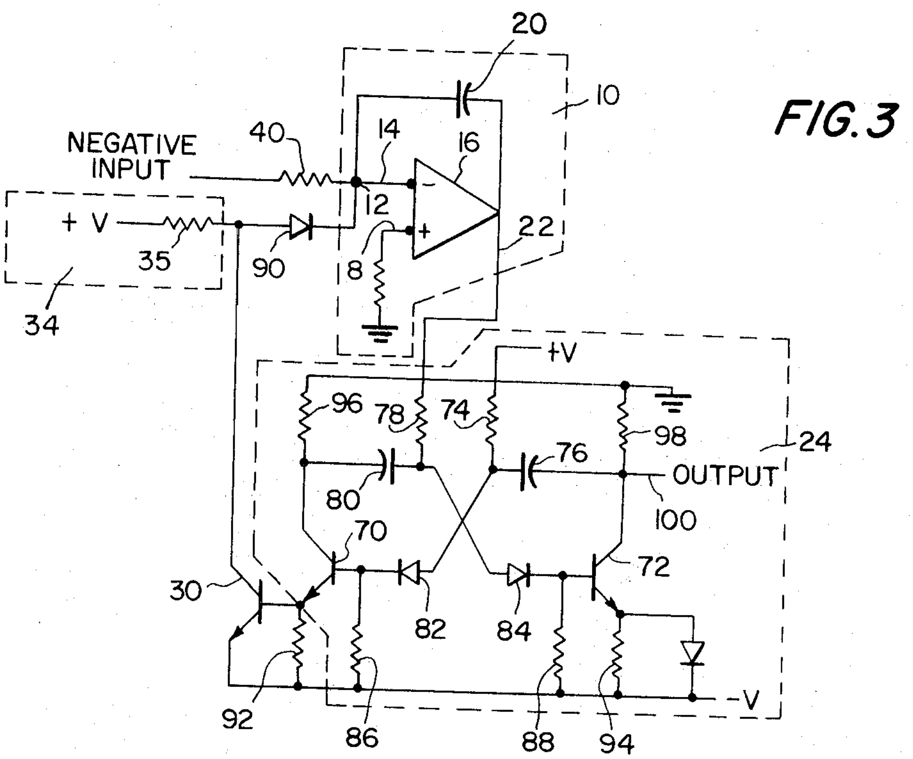
FIG. 3 is a schematic illustration of yet another embodiment of the invention.

Another embodiment of the invention is illustrated in FIG. 3 wherein an astable multivibrator is used as the voltage-controlled oscillator.

The circuit of FIG. 3, as is the case with each of the embodiments of this invention, may be inverted for positive input signals. The operations of integrator 10, feedback current source 34 and transistor switch 30 are the same as in the embodiment of FIG. 2.

Astable multivibrator 24 operates so that transistor 70 will be off and transistor 72 will be on for a fixed time as determined by the time constant set by resistor 74 and capacitor 76. When the multivibrator changes its conducting state, transistor 70 is on and transistor 72 is off for a variable time as determined by the time constants set by resistor 78 and by capacitor 80. Diodes 82 and 84 as well as resistors 86 and 88 can be eliminated if the emitter-base breakdown voltage of transistors 70 and 72 is not exceeded. Diode 90 and resistors 92 and 94 are used for biasing.

In operation, when transistor 72 is biased on by resistor 78 to produce an output pulse at terminal 100, transistor 70 is off, capacitor 80 is fully charged via resistor 96 and capacitor 76 is discharged via resistor 74 until transistor 70 is forward biased. When transistor 70 becomes sufficiently forward biased the multivibrator changes state so that transistor 70 is on, transistor 72 is off, and no output signal is produced at output terminal 100. Capacitor 76 is then fully charged via resistor 98, capacitor 80 is discharged via resistor 78 and the output for integrator 10 until transistor 72 is again forward biased and the multivibrator reverts to the original state.

Thus, when the output from integrator 10 becomes sufficient to turn transistor 72 on, an output pulse is provided at output 100 of the converter. During this time transistor 70 is off and transistor 30 is also off so that feedback current is applied to the integrator from current source 34. When the multivibrator changes its conducting state and no longer produces a pulse at output terminal 100, transistor 70 is on and transistor 72 is off. As a result, transistor 30 is also on and feedback current from source 34 is diverted through transistor 30 and is no longer applied to the input of integrator 10. Thus, the output from integrator 10 will slew until the time average of the fixed width feedback current pulses is exactly equal to the input current, and a directly proportional current-to-frequency converter results.

Figure 4:
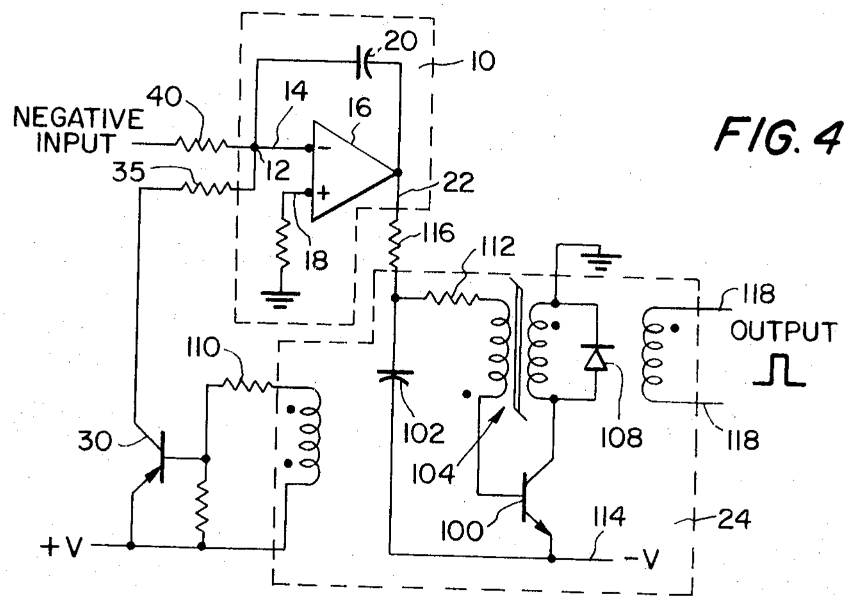
FIG. 4 is a schematic diagram of still another embodiment of the invention.

Still another embodiment of the invention is illustrated in FIG. 4 wherein a magnetic blocking oscillator is used as the voltage-controlled oscillator.

Again, the operation of integrator 10 is the same as in previously described embodiments, but the feedback current is applied to integrator 10 via resistor 35 when transistor 30 is conducting in contrast to the two previously described embodiments.

The blocking oscillator operates by regeneratively turning on transistor 100 when the charge on capacitor 102 from integrator 10 is sufficient to forward bias the transistor. When the transistor is on, the magnetic field in transformer 104 increases linearly until the transformer saturates and the loop gain drops below unity. When this occurs, transistor 100 switches off and the transformer fly backs into diode 108. Thus, the time during which transistor 100 is on, i.e., the pulse width, is determined by the saturation of transformer 104 and is constant. During the on time of transistor 100, transistor 30 is biased on through resistor 110, and capacitor 102 is discharged by the regenerative base current of transistor 100. This current is determined by resistor 112, the turns ratio of transformer 104 and the supply voltage at terminal 114.

When transistor 100 regeneratively turns off upon saturation of transformer 104, capacitor 102 is charged at a rate determined by resistor 116 and the output voltage of integrator 10 until transistor 100 is again forward biased. Another fixed width pulse is then generated across output terminals 118 as previously described.

Thus, the present invention provides for a unique current or voltage-to-frequency converter that utilizes overall negative feedback to provide extremely high linearity and stability while using only a few components. Although in each of the embodiments described the input current or voltage is applied to an inverting integrator, it should be understood that a noninverting integrator can also be used. Furthermore, if the current feedback is switched into the integrator input during the interval between output pulses instead of the intervals during output pulses, and the circuit arrangements are reversed from those described, an inversely proportional voltage or current-to-frequency converter can be provided.

The invention in its broader aspects is not limited to the specific details shown and described and departures may be made from such details without departing from the principles of the invention and without sacrificing its chief advantages.

What is claimed is:

1. A circuit for converting a DC electrical signal to a proportionate frequency of electrical pulses of predetermined width, comprising:

means for integrating said electrical signal to provide an integrated output from said integrating means;

voltage-controlled oscillator means in circuit with said integrating means for providing said electrical pulses at a frequency controlled by the integrated output from said integrating means; and negative feedback means in circuit with said voltage-controlled oscillator means and said integrating means, for providing feedback current pulses to said integrating means and for enabling said integrating means, in response to differences between the DC electrical signal and the average of said feedback current pulses supplied to said integrating means, to provide a substantially constant integrated output for a constant value of said DC electrical signal.

2. A circuit as in claim 1 wherein said negative feedback means include:

an electrical current source; and switching means in circuit with said current source, said integrating means, and said oscillator means; said switching means selectively enabling current from said current source to flow into said integrating means in polarity opposition to said DC electrical signal.

3. A circuit as in claim 2 wherein said switching means is in operative relationship with said current source, said integrating means and said oscillator means, for enabling current to flow from said current source into said integrating means in opposition to said DC electrical signal only during said electrical pulses.

4. A circuit as in claim 2 wherein said switching means is a transistor having its base terminal coupled to said oscillating means and its collector terminal coupled to said integrating means.

5. A circuit as in claim 2 wherein said integrating means includes:

an amplifier having first and second input terminals and an output terminal;

an integrating capacitor coupled between said first input terminal and said output terminal;

said output terminal coupled to said oscillating means and said first input terminal coupled to said negative feedback means and to receive said DC electrical signal.

6. A circuit as in claim 5 wherein said oscillating means is an astable voltage-controlled oscillator.

7. A circuit as in claim 5 wherein said oscillating means is an astable multivibrator.

8. A circuit as in claim 5 wherein said oscillating means is a magnetic blocking oscillator.

9. A circuit as in claim 5 wherein said electrical energy is a DC voltage, and wherein said circuit further includes:

means in circuit with said integrating means for converting said voltage to a corresponding DC current.

10. A circuit as in claim 9 wherein said converting means is a resistor.

11. A method for converting a DC electrical signal to a proportionate frequency of electrical pulses of predetermined width, comprising the steps of:

passing an electrical signal through an integrator to provide an integrated output;

providing said electrical pulses of predetermined width at a frequency controlled by the output from said integrator; and providing negative feedback current pulses to said integrator for enabling the integrator, in response to differences between the DC electrical signal and the average of the feedback current pulses supplied to the integrator, to provide a substantially constant integrated output for a constant value of said DC electrical signal.

* * * * *